United States Patent
Osellame et al.

(10) Patent No.: US 7,215,856 B2
(45) Date of Patent: May 8, 2007

(54) RECONFIGURABLE OPTICAL DEVICE FOR WAVELENGTH DIVISION MULTIPLEXING NETWORKS

(75) Inventors: Roberto Osellame, Milan (IT); Roberta Ramponi, Milan (IT); Marco Marangoni, Milan (IT)

(73) Assignee: Politecnico Di Milano, Milan (IT)

( * ) Notice: Subject to any disclaimer, the term of this patent is extended or adjusted under 35 U.S.C. 154(b) by 0 days.

(21) Appl. No.: 10/472,138

(22) PCT Filed: Mar. 13, 2002

(86) PCT No.: PCT/EP02/02795

§ 371 (c)(1),
(2), (4) Date: Jan. 20, 2004

(87) PCT Pub. No.: WO02/073305

PCT Pub. Date: Sep. 19, 2002

(65) Prior Publication Data
US 2005/0047712 A1    Mar. 3, 2005

(30) Foreign Application Priority Data
Mar. 14, 2001 (IT) .......................... MI2001A0539

(51) Int. Cl.
*G02B 6/00* (2006.01)
(52) U.S. Cl. ........................................ 385/122; 385/24
(58) Field of Classification Search ................ 385/122, 385/24, 37, 14, 42
See application file for complete search history.

(56) References Cited

U.S. PATENT DOCUMENTS

| | | | |
|---|---|---|---|
| 5,123,070 A * | 6/1992 | Bradley | 385/37 |
| 5,339,189 A | 8/1994 | Boczar | |
| 5,596,667 A * | 1/1997 | Watanabe | 385/122 |
| 5,875,272 A * | 2/1999 | Kewitsch et al. | 385/37 |
| 5,946,430 A | 8/1999 | Morrow et al. | |
| 6,072,925 A * | 6/2000 | Sakata | 385/24 |
| 6,084,997 A * | 7/2000 | Utaka et al. | 385/37 |
| 6,876,793 B1 * | 4/2005 | Ling et al. | 385/37 |
| 2002/0135865 A1 * | 9/2002 | Tilleman et al. | 359/326 |

FOREIGN PATENT DOCUMENTS

EP    1 076 429    2/2001

OTHER PUBLICATIONS

Patent Abstracts of Japan vol. 1998, No. 04, Mar. 13, 1998 & JP 09 329817 A (Mitsubishi Cable Ind Ltd), Dec. 22, 1997 Abstract.

* cited by examiner

*Primary Examiner*—Ellen E. Kim
(74) *Attorney, Agent, or Firm*—Hedman & Costigan P.C.; James V. Costigan

(57) ABSTRACT

A reconfigurable optical device for wavelength-division multiplexing networks, comprising two waveguides (A, B) parallel to each other, with two-dimensional confinement, coupled by a bi-directional coupler (C), suitable to selectively drop one and only one of the channels composing the Wavelength-Division multiplexing signal (WDM); the device is reconfigurable as, by appropriately varying the wavelength of the combined pumping beam inside a first waveguide (A), any channel forming the WDM signal can be dropped.

8 Claims, 3 Drawing Sheets

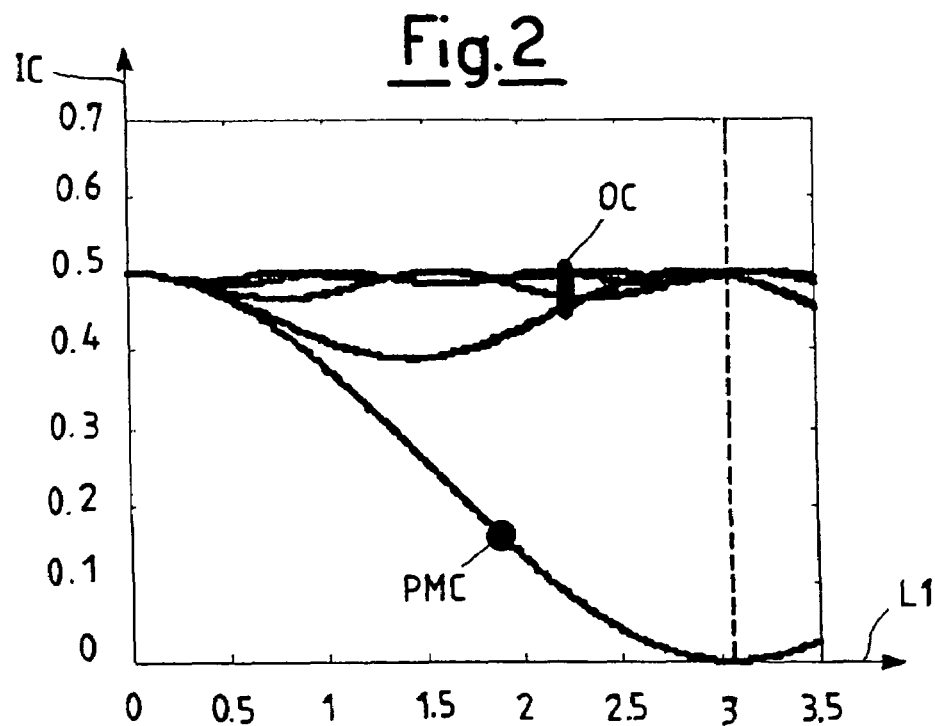
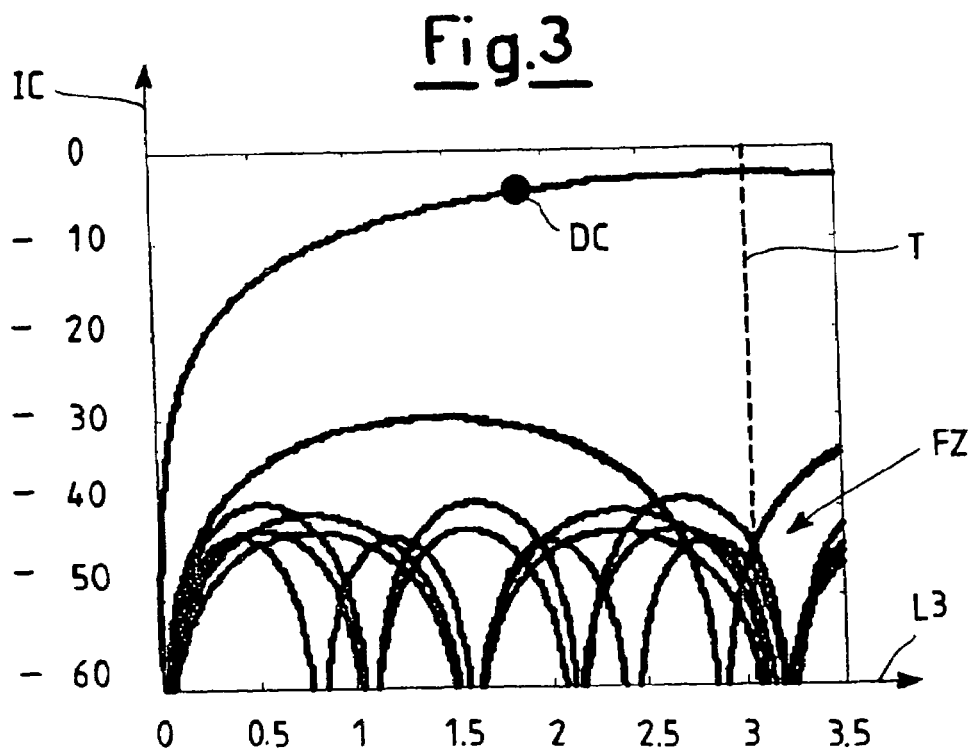

RECONFIGURABLE OPTICAL DEVICE FOR WAVELENGTH DIVISION MULTIPLEXING NETWORKS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not applicable

BACKGROUND OF THE INVENTION (1) Field of the Invention

The present invention relates to a reconfigurable optical device for Wavelength-Division Multiplexing networks.

The increasingly vast diffusion of the Internet and consequent demand for an increasingly wide band in optical communications has led to the by now uncontested success of the Wavelength-Division Multiplexing (WDM) transmission system.

The advantage of this configuration is that, by modulating several carriers independently at different wavelengths, it is possible to make optimum use of the extremely wide band offered by optical fibres with technologies already available on the market.

Nonetheless, the bottleneck of these transmission systems currently lies in the specifications of the signal processing and routing devices, which are implemented with optoelectronic technologies, which limit the band that can actually be used in optical communications.

Scientific research aimed at producing these devices in a completely optical manner is thus understandably extremely active, both on the industrial and the scientific-university sides.

(2) Description of Related Art

One of the devices that arouses the most interest is undoubtedly the one that performs the functions of "add/drop"; as already mentioned, the WDM signal is formed of several carriers, modulated independently from one another and each at a different wavelength.

In dynamic management of a telecommunications network, it is frequently necessary to drop only one of the channels of the WDM signal ("drop" function), for example to route it to another communication line, or to add a channel to a WDM signal at a wavelength that has remained empty.

The devices proposed to date to produce these functions are based on linear optical effects and can be divided into two categories: the first uses the "arrayed waveguide gratings" with the addition of thermo-optical switches or phase shifters, while the second comprises all those configurations in which two waveguides are coupled by means of an extremely narrow band-pass filter.

These band-pass filters can be produced by a Bragg grating written in the coupling zone of two fibres, between two vertically coupled semiconductor waveguides, in a Mach-Zehnder interferometer or, lastly, by fitting micro-ring resonators at the cross-points of two waveguides.

In any case, the problems of these configurations are considerable and essentially lie in the high losses of the first type of devices and the lack of propensity, if not impossibility, to be reconfigured in devices of the second type.

Finally, when the number of channels contained in the WDM signal increases, there is an increase in the complexity and number of elements involved in architectures based on previous devices, with evident disadvantages as regards cost and technology.

The object of the present invention is thus to produce a reconfigurable optical device for wavelength-division multiplexing networks which obviates the problems mentioned above, or to indicate a reconfigurable optical device that avoids the problem of filtering with an extremely narrow band, moving the function from the coupler to the non-linear process for generating a sum frequency in a first waveguide.

Another object of the present invention is to indicate a reconfigurable optical device for wavelength-division multiplexing networks that allows only one channel of those forming the WDM signal to be selectively dropped without modifying the remaining channels.

A further object of the present invention is to produce a reconfigurable optical device for wavelength-division multiplexing networks that allows any channel forming the WDM signal to be dropped and, at the same time, is sufficiently simple to use, easy to rescale and transparent to the number of channels of the WDM signal, compared with known structures.

These objects can be attained with a reconfigurable optical device for wavelength-division multiplexing networks according to claim 1, which is referred to for brevity.

BRIEF SUMMARY OF THE INVENTION

Advantageously, the device according to the present invention is composed of two waveguides parallel to each other with two-dimensional confinement, coupled by a bi-directional coupler; by making use of the narrow "phase-matching" band of the non-linear interactions of the second order, it is possible to obtain the generation of a sum frequency from only the desired channel until this has been completely emptied.

The sum frequency signal is then extracted from the directional coupler and introduced into the second waveguide, where, by means of an inverse process to generate a difference frequency, it returns to supply the initial channel.

The device can be reconfigured as, by appropriately varying the wavelength of the pumping beam in the first waveguide, any channel forming the WDM signal can be dropped.

In practice, the device according to the invention, based on non-linear interactions of the second order in QPM ("Quasi-Phase-Matched"), waveguides, makes use of an entirely optical technology and includes the "add/drop" function.

In particular, the use of a QPM configuration is envisaged to maximise the efficiency of non-linear interactions; with a view to this, in a non-limiting exemplary embodiment of the present invention, a periodic sampling range is chosen to obtain a condition of "Quasi-Phase-Matching" (QPM)

between the pumping device and one of the wavelengths of the WDM signal, for example a central wavelength.

Functionality of the non-linear interactions makes it possible to obtain a much more flexible device than those of the same type belonging to prior art, with greater functional advantages, combined together internally, moreover, with extremely simple geometry; furthermore, it is thus possible to obtain a wide tuning range, a drastic reduction in "crosstalk" phenomena and complete integration of the most important functions of the device, such as "shifting" the wavelengths for WDM signals and optical sampling for TDM (Time-Division-Multiplexing) signals.

BRIEF DESCRIPTION OF THE SEVERAL VIEWS OF THE DRAWINGS

Further objects and advantages of the present invention shall become clear from the description below and appended drawings, provided purely as a non-limiting explanatory example, in which:

FIG. 2 shows in a Cartesian graph the intensity trend of 16 channels following the process to generate a sum frequency with a pumping beam in a first portion of the reconfigurable optical device according to the present invention;

FIG. 3 shows in a Cartesian graph the intensity trend of 16 channels following the process to generate a difference frequency with a pumping beam in a third portion of the reconfigurable optical device according to the present invention;

DETAILED DESCRIPTION OF THE INVENTION

Figure 4:
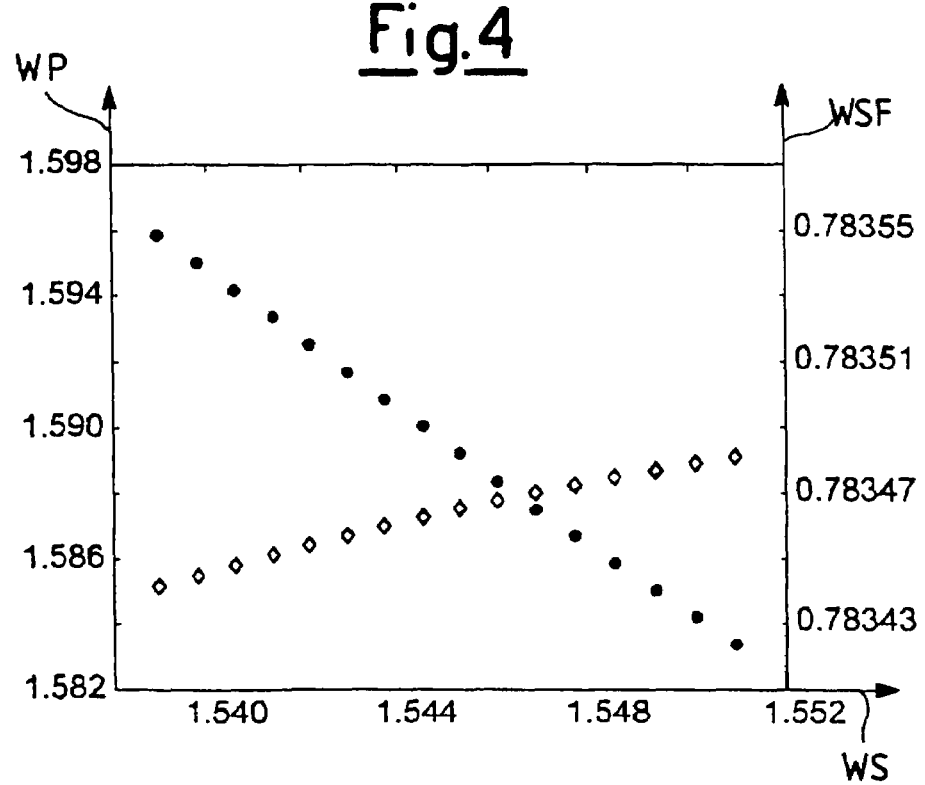
FIG. 4 shows in a Cartesian graph with two ordinate axes a calibration of the reconfigurable optical device, according to the present invention, relative to its capacity to drop any channel of the WDM signal.

It must be stressed that FIGS. 2 and 3 give the results of a series of numeric simulations on the operation of the device according to the invention, hypothesizing a WDM signal with 16 channels spaced by 100 GHz, while FIG. 4 shows, for each channel to be dropped, the necessary wavelength of the pumping signal and consequent wavelength of the sum frequency signal.

With reference to the figures mentioned, the reconfigurable optical device according to the present invention is composed of two waveguides A and B, parallel, produced in a material, presenting non-linearity of the second order, and with two-dimensional confinement, coupled by a waveguide bi-directional coupler, indicated with C.

Figure 1:
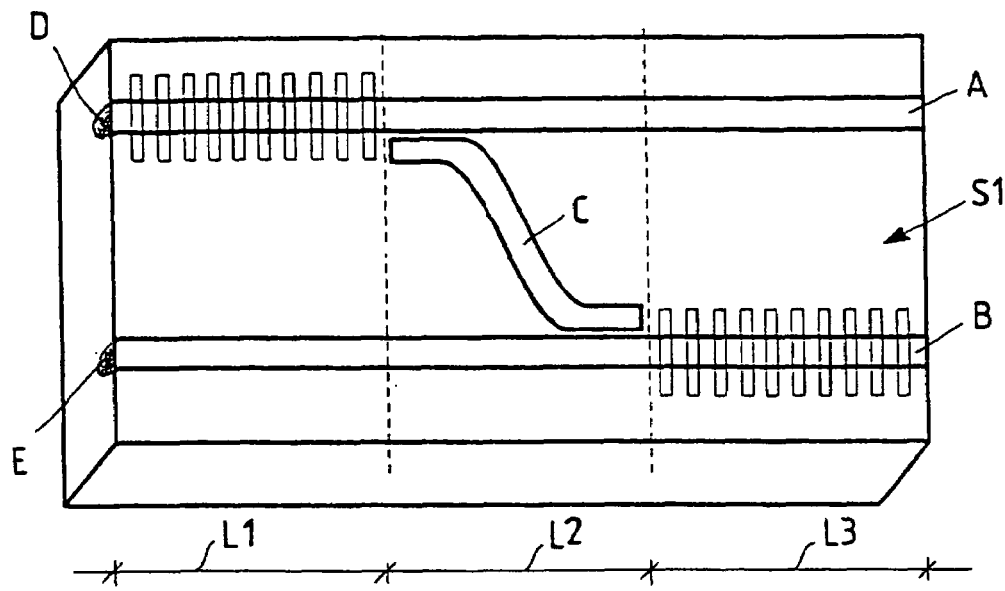
FIG. 1 shows an overall schematic view of a reconfigurable optical device for wavelength division multiplexing, according to the present invention.

The example shown in FIG. 1 and used for the numeric simulations envisages the use of waveguides A and B produced on a lithium niobate substrate S1, with periodic inversion of the ferro-electric domains, respectively in a first zone or portion L1 of the waveguide A of the device and in a third zone or portion L3 of the waveguide B of the same device.

This geometrical layout is adopted in order to increase the efficiency of the non-linear interactions.

Preferably, portions L1 and L3 of the same interaction length and equal domain inversion periods are normally used in the two waveguides A and B; in this way, if the pumping devices used at the input to the waveguides A and B have the same wavelength and the same potency, the emptied channel is totally reconverted to the original wavelength at the output terminal of the waveguide B; on the other hand, if these pumping devices have different wavelengths, the process to generate a difference frequency will generate a signal at a different wavelength to the original one.

In practice, the idea on which the device is based is to completely empty a predetermined transmission channel of the WDM signal by means of a procedure to generate a sum frequency using a pumping device coupled to a first portion of the waveguide A.

In fact, at the input D of the waveguide A both the WDM signal (which in the non-limiting exemplary example of the invention comprises 16 channels spaced by 100 GHz) and the pumping beam are coupled with traditional techniques; the latter has a wavelength WP selected specifically according to the wavelength WS of the WDM signal and the wavelength of the sum frequency signal wavelength WSF (according to the graph in FIG. 4), to satisfy the "phase-matching" condition with the channel to be dropped. It is important to note that the variation of the wavelength of the pumping signal is of the same order as the wavelength range of the WDM signal, while the corresponding wavelength of the sum frequency signal is almost constant to the fourth decimal digit; as a direct consequence, the waveguide directional coupler C does not need any technical modifications if already designed for the sum frequency corresponding to the central channel.

At the end of the first portion L1 of the waveguide A of the optical device, the subject-matter of this invention, the channel involved will be totally emptied, while the other channels will have returned to the initial values within a mean percentage range of 1%.

At this point, the waveguide directional coupler C, positioned in the portion L2 of the device according to the invention, only totally extracts the signals at the sum frequency, leaving the remaining channels of the WDM signal unvaried.

For this purpose, the waveguide C of the directional coupler must be designed with parameters that place its cut-off frequency between the frequency of the WDM signal and the sum frequency.

Moreover, the guided mode at sum frequency of the waveguide C of the directional coupler must be synchronous with that of the waveguides A and B for effective coupling of the three guides A, B and C.

The sum frequency signal found in the waveguide B thus interacts with a second optical pumping signal, coupled with traditional techniques at the input E of the waveguide B, in order to reconvert the sum frequency signal into one of the wavelengths of the WDM signal by means of a process to generate a difference frequency.

Re-conversion of the original wavelength of the sum frequency signal (DC function) is represented in FIG. 3, together with the spurious signals (functions generally indicated with FZ) caused by the presence of other channels in the WDM signal.

In particular, in FIG. 3 the intensity of the channels IC of the WDM signal is represented in dB along the ordinate axis, while the variation in the length of the portion L3 of the device according to the invention is represented along the abscissa axis.

Finally, in FIG. 3 it is easy to understand that "cross-talk" in the extracted signal at the position marked with a dashed line indicated by T is in any case below −41 dB, among the lowest values found in the literature.

With regard to the reconfigurability of the device, it has been verified that, even by varying the wavelength of the pumping signal so that each channel of the WDM signal is extracted, there is no variation in performances of the device with these dimensions.

In particular, as shown in the graph in FIG. 4, there is no significant variation in the wavelength WSF of the sum frequency signal upon variation of the channel to be dropped and this is an important advantage as the waveguide directional coupler C, designed to obtain maximum transfer of only one signal at sum frequency, does not require to be reconfigured dynamically when the channel to be dropped is changed; therefore, the conclusion is reached that the reconfigurable entirely optical device which may also have an "add-drop" function, according to the present invention, solves the problem of filtering with a very narrow band (bearing in mind that the distance between different channels in a standard wavelength division multiplexing network (WDM) is equal to 100 GHz), moving the function from the waveguide directional coupler C to the non-linear process of generating a sum frequency in the portion L1 of the guide A.

The waveguide directional coupler C, which extracts the signal at the sum frequency and transmits it to the waveguide B, does not thus need to comply with extremely high requirements relative to its transmission band, but only requires to have a cut-off frequency between the sum frequency and the frequency of the WDM signal, so that information is only extracted at the sum frequency corresponding to the channel involved PMC in linear interaction (see FIG. 2 in relation to this), leaving the other channels OC in the guide A unvaried.

In the guide B, the inverse process to generate a difference frequency makes it possible to re-obtain the initial channel DC with "cross-talk" of the other channels estimated at a value below −41 dB.

As mentioned above, the use of non-linear optical processes requires the introduction of two pumping lasers at the inputs D, E of the waveguides A and B and, in any case, considerably increases the flexibility of the device; in fact, as already mentioned, by appropriately varying the wavelength of the pumping signal in the portion L1 of the waveguide A, it is possible to dynamically reconfigure the device to drop any channel forming the WDM signal.

Moreover, by appropriately varying the wavelength of the pumping signal in the portion L3 of the guide B it is possible to vary the process to generate the difference frequency, in order to re-obtain the information contained in the channel involved at a different wavelength to the initial one.

In this way, an operation to "shift" the wavelength, which is also extremely important for dynamic management of the communication networks, is also performed in the same device, Lastly, the device is transparent to the number of channels, meaning that it maintains its configuration irrespective of the number of channels forming the WDM signal.

The use of a pulsed pump in the portion L1 of the guide A makes it possible to drop only a part of the channel involved and, therefore, by appropriately controlling the temporal trend of the pumping signal, it is possible to decode a TDM (time-division-multiplexing) signal contained in one of the channels of the WDM signal.

Furthermore, the "add" function of the device according to the invention is easy to obtain with a subsequent optical coupling stage, per se known.

The results of the simulations performed are represented in detail, as already mentioned, in the graphs in FIGS. 2 and 3.

These simulations were performed using, for simplicity, planar waveguides A and B in the portions L1 and L3 of the device, with a refraction index that varies and decreases exponentially as a function of the length, with a specific index change value equal to 0.0070 at a wavelength of 1.55 µm; moreover, a substrate S1 produced in lithium niobate (LiNbO$_3$), of the "Z-cut" type, was used with $d_{eff}$=21 pm/V for a QPM of the first order, and guided modes of the type TM$_0$.

Non-linear interactions were represented using the well-know non-linear propagation equations, written for propagative modes in planar waveguides; also taken into account was the generation of a sum frequency between the optical pumping signal and all the channels of the WDM signal, the generation of a difference frequency between the aforesaid sum frequency, corresponding only to the "phase-matched" channel PMC, and all channels of the WDM signal.

With regard to the initial conditions relative to the portion L1 of the waveguide A, the channels all have the same power density, equal to 0.5 W/cm, the pumping signal envisages a power density equal to 1.05 kW/cm, while all other signals are null.

In the case of the portion L3 of the waveguide B, on the other hand, the initial conditions are composed of: power density of the pumping signal=1.05 kW/cm and power density of the channels null, while the sum frequencies corresponding to the various channels have the same power found at the terminal of the waveguide A in the portion L1.

Moreover, optimization of the parameters of the waveguides A and B is envisaged, in order to reduce the power intensity value of the pumping signal; finally, as a precaution, it was assumed that all the sum frequencies are transferred completely to the waveguide B and that the pumping signals found at terminals D and E are equal.

The quantitative numeric results obtained with a wavelength of the pumping signal equal to 1.59 µm, as a function of the propagation length, in the stretch L1 of the waveguide A, are visualized in FIG. 2, while the same results relative to the stretch L3 of the waveguide B are indicated in the graph in FIG. 3.

If a length of the portions L1 and L3 equal to 3.05 cm is chosen, at the end of the portion L1 of the waveguide A, the PMC channel at the wavelength of 1.55 µm (the only one in QPM mode with the pumping signal) is totally emptied, while the remaining OC channels have a variation within 1% of the initial power intensity; at the end of the portion L3 of the waveguide B, the DC channel at the wavelength of 1.55 µm is totally reconverted to the initial power intensity (assuming that the waveguide directional coupler C and the waveguides A and B have no leaks), while the remaining channels FZ have a much lower level of intensity; in fact, from the graph in FIG. 3 it can be seen that, at this wavelength, the estimated cross-talk value, at the output terminal of the portion L3 of the waveguide B (reference T in FIG. 3), has a value below −41 dB.

As mentioned before, it is emphasized that the internal waveguide C of the directional coupler must be at the cut-off for the wavelengths of the WDM signal and must have the same effective refraction index as the waveguides A, B at the sum frequencies; to reach this condition, it must be possible to take action on the variation of the refraction index and the dimensions of the waveguide C.

In order to overcome any technological difficulties, it is possible to use a vertically coupled configuration of waveguide directional coupler C, so that the coupling waveguide C can be produced separately from the other two waveguides A and B (where non-linear phenomena occur), with arbitrary parameters and different technology.

From the above description the characteristics and advantages of the reconfigurable optical device for wavelength division multiplexing networks, the subject of the present invention, are apparent.

Finally, it is apparent that numerous other variants may be made to the optical device in question, without departing from the principles of intrinsic novelty of the inventive idea, just as it is clear that, in practical embodiment of the invention, the functions, materials, forms and dimensions of the parts illustrated may be any according to the requirements and these may be replaced with others technically equivalent.

For example, the optical device according to the present invention may assume a different geometrical configuration, without this altering the overall purpose of the invention, namely to selectively drop one and only one of the channels that form the WDM signal, with the chance of selecting it arbitrarily and to translate it in wavelength once dropped.

The different geometry of the device does not even change the basic physical principle of the invention, which includes the generation of a sum frequency with a pumping beam specifically selected to empty the channel involved, the separation of the sum frequency signal from the rest of the WDM signal and the reconversion of the sum frequency signal to the original or slightly translated wavelength, by means of a process to generate a difference frequency.

This exemplificative and alternative embodiment from the one described previously and shown in particular in FIG. 1, instead of two parallel guides connected by a bi-directional coupler, envisages the use of one guide only and a terminal mirror, that totally reflects radiation at the sum frequency and which allows the WDM signal and pumping beams to pass with unit transmissivity.

Figure 5:
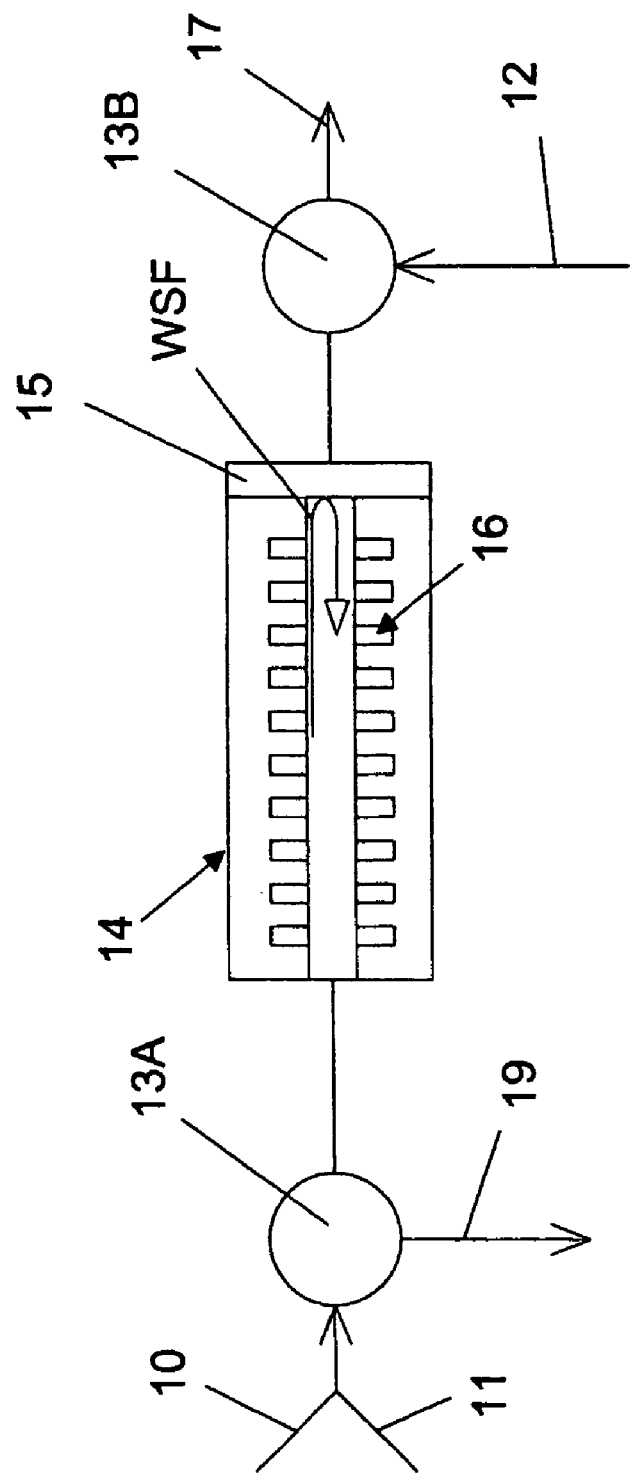
FIG. 5 schematically represents a further example of configuration, alternative in relation to what is shown in FIG. 1, of a reconfigurable optical device for wavelength division multiplexing, according to the present invention.

With particular reference to FIG. 5, the WDM signal is indicated generically with 10, a first and second pumping beam are indicated respectively with 11 and 12, while two optical circulators are indicated schematically with 13A and 13B, a QPM optical guide is indicated generically with 14 and the mirror positioned at one of the ends of the guide 14 is indicated with 15.

In the example of embodiment in FIG. 5, as illustrated, it is possible to reduce, in relation to FIG. 1, the number of waveguides from two to one; this is possible as the only waveguide 14, in this case, is used in both directions, from left to right and from right to left.

Moreover, the functions to extract the sum frequency signal WSF from the first guide A and to couple this sum frequency signal WSF in the second guide B, performed, in the configuration described previously, by the bi-directional coupler C, is in this case implemented by the mirror 15 which by reflecting only the sum frequency WSF, separates this from the remaining WDM signal, without the dropped channel DC, and re-couples this in the same guide 14, but in the opposite direction.

The signal WDM 10 and the pumping beam 11 are sent in the optical circulator 13A which routes them to the guide 14 produced on the non-linear substrate, on which a grating 16 for the QPM is produced.

The process to generate a sum frequency WSF between the channel to be dropped and the pumping beam 11 totally empties the aforesaid channel in the length of the guide 14.

At the end of the guide 14, the mirror 15 permits the WDM signal, without the emptied channel, and the pumping beam 11, to pass; by means of a second optical circulator 13B, these signals reach the output 17 of the device.

The sum frequency WSF is instead totally reflected by the mirror 15 and travels along the guide 14 in the opposite direction.

A second pumping beam 12 is introduced into the optical circulator 13B and is then coupled in the guide 14 from right to left, superimposing the reflected sum frequency WSF.

The process to generate a difference frequency between the pumping beam 12 and the reflected sum frequency WSF therefore leads to the reconversion of the sum frequency signal to the original wavelength.

At this point the optical circulator 13A sends the dropped channel to the output 19, different from the one from which the remaining WDM signal without the dropped channel is delivered (output 17).

As already described in the example in FIG. 1, also in this configuration the optical device can be made reconfigurable with an appropriate variation of the wavelength of the pumping beam 11, so that an arbitrarily selected channel of the WDM signal 10 is emptied.

Moreover, by varying the wavelength of the pumping beam 12, it is possible to reconvert the dropped channel to different wavelengths from the original one, thus implementing a further extremely important function in all-optical networks, called "wavelength shifting".

The invention claimed is:

1. A reconfigurable optical device for wavelength division multiplexing networks, comprising at least two waveguides (A, B, 14) with two-dimensional confinement, reached by at least one wavelength division multiplexing, or WDM, input signal (1) and at least one first optical pumping beam (11) characterized in that it comprises said waveguides (A, B) being produced with a material presenting non-linerity of the second order, said waveguides (A, B) being produced on at least one substrate (S1), on which in a first portion (L1) of said substrate (S1) on a first waveguide (A) of said waveguides is used in a way to generate a sum frequency signal (WSMF) using a "phase-matching" technique between a predetermined channel (WS) of WDM signals and said pumping beam (WP), in a second portion (L2) of said substrate, a bidirectional optical coupler (C) connecting said two waveguides is provided, said directional optical coupler (C) having a cut-off frequency between the frequency of said WDM input signal and a sum frequency (WSF) in a way to extract the signal from said first waveguide (A) at sum frequency (WSMF) and sending it to a second waveguide (B), and in a third portion (L3) of said substrate on the second waveguide (B) of said waveguides (A, B) at least one "phase-matching" technique is used in a way to reconvert the sum frequency signal into one of the wavelength of the WDM signal.

2. A reconfigurable optical device as claimed in claim 1, characterized in that said WDM input signal comprises a series of channels spaced in frequency and that said first optical pumping beam has a variable and predetermined wavelength (WP) on the basis of the wavelengths (WS) of said channel that has to be extracted from the WDM signal.

3. A reconfigurable optical device as claimed in claim 1, characterized in that, at one of the terminals of said first portion (L1) of said first waveguide (A), at least one selectively dropped channel (DC) from those forming said WDM signal is completely emptied.

4. A reconfigurable optical device as claimed in claim 1, characterized in that by varying the wavelength of said second optical pumping beam, said device is able to translate said selectively dropped channel (DC) to a predefined wavelength value.

5. A reconfigurable optical device as claimed in claim 1, characterized in that said waveguides (14) have at least one mirror (15) positioned at, at least one of the ends of said waveguides, said mirror (15) being able to totally reflect at least one radiation at a sum frequency (WSF) and to transmit said WDM input signal (10) and said first optical pumping beam (11).

6. A reconfigurable optical device as claimed in claim 5, characterized in that said mirror (15), reflecting only said sum frequency (WSF), separates said sum frequency (WSF) from said WDM input signal (10) without at least one dropped channel, and re-couples it inside said waveguides (14), said WDM input signal (10) and said first pumping beam (11) being sent inside at least a first optical circulator (13A) which routes them inside said waveguides (14).

7. A reconfigurable optical device as claimed in claim 6, characterized in that said WDM input signal (10), without said dropped channel, and said first pumping beam (11), by means of at least a second optical circulator (13B), reach an output (17) of said reconfigurable optical device, said sum frequency (WSF) being totally reflected by said mirror (15) and travelling along said waveguides (14) in the opposite direction to the direction of said WDM input signal (10).

8. A reconfigurable optical device as claimed in claim 7, characterized in that a second pumping beam (12) is introduced into said second optical circulator (13B) and is coupled inside said waveguides (14), so as to superimpose said reflected sum frequency (WSF), so that a process to generate a difference frequency, between said second pumping beam (12) and said reflected sum frequency (WSF), determines a re-conversion of said sum frequency signal (WSF) to an original wavelength value, said first optical circulator (13A) being capable of sending said dropped channel to a different output (19) in relation to the output (17) from which said WDM input signal (10) without said dropped channel is delivered.

* * * * *